United States Patent
Tanna

(10) Patent No.: US 10,448,243 B2
(45) Date of Patent: Oct. 15, 2019

(54) SYSTEM AND METHOD TO FACILITATE DEVICE TRIGGERING FOR NON-INTERNET PROTOCOL DATA DELIVERY IN A NETWORK ENVIRONMENT

(71) Applicant: CISCO TECHNOLOGY, INC., San Jose, CA (US)

(72) Inventor: Poojan Tanna, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/467,948

(22) Filed: Mar. 23, 2017

(65) Prior Publication Data

US 2018/0279115 A1   Sep. 27, 2018

(51) Int. Cl.
| | |
|---|---|
| H04W 8/22 | (2009.01) |
| H04L 29/12 | (2006.01) |
| H04W 4/14 | (2009.01) |
| H04W 8/08 | (2009.01) |
| H04W 4/18 | (2009.01) |

(Continued)

(52) U.S. Cl.
CPC ........... *H04W 8/22* (2013.01); *H04L 61/1588* (2013.01); *H04W 4/14* (2013.01); *H04W 4/18* (2013.01); *H04W 4/70* (2018.02); *H04W 8/04* (2013.01); *H04W 8/082* (2013.01); *H04W 8/18* (2013.01); *H04W 92/16* (2013.01)

(58) Field of Classification Search
CPC ......... H04W 4/70; H04W 8/04; H04W 36/32; H04W 4/14; H04W 8/02; H04W 8/18; H04W 8/08
See application file for complete search history.

(56) References Cited

U.S. PATENT DOCUMENTS 6,208,870 B1 * 3/2001 Lorello ................... H04W 4/14
455/412.1
8,768,386 B2 * 7/2014 Chen ....................... H04W 4/14
370/229

(Continued)

FOREIGN PATENT DOCUMENTS

WO   2017027071 A1   2/2017

OTHER PUBLICATIONS

3GPP TS 23.002 V14.0.0 (Sep. 2016) Technical Specification: 3rd Generation Partnership Project; Technical Specification Group Services and System Aspects; Network architecture (Release 14), 3GPP, 650 Route des Lucioles—Sophia Antipolis Valbonne—France, Sep. 2016; 113 pages.

(Continued)

*Primary Examiner* — Dung Hong
(74) *Attorney, Agent, or Firm* — Patterson + Sheridan, LLP

(57) ABSTRACT

A method is provided in one example embodiment and may include receiving, by a Service Capability Exposure Function (SCEF), a request to send data to a user equipment (UE), wherein a context for the UE is not available at the SCEF when the request is received; querying a subscriber database to determine whether the context for the UE is available at the subscriber database; and sending the data for the UE to a Mobility Management Entity (MME) by the SCEF using an interface directly interconnecting the MME and the SCEF based on a determination that the context for the UE is available at the subscriber database.

17 Claims, 5 Drawing Sheets

(51) Int. Cl.
  *H04W 8/04*    (2009.01)
  *H04W 4/70*    (2018.01)
  *H04W 92/16*   (2009.01)
  *H04W 8/18*    (2009.01)

(56) References Cited

U.S. PATENT DOCUMENTS

| | | | |
|---|---|---|---|
| 2013/0303206 A1 | 11/2013 | Starsinic et al. | |
| 2013/0308564 A1* | 11/2013 | Jain | H04B 15/00 370/329 |
| 2014/0089442 A1 | 3/2014 | Kim et al. | |
| 2015/0189460 A1* | 7/2015 | Zhang | H04L 45/125 370/329 |
| 2015/0245162 A1* | 8/2015 | Chao | H04L 12/189 370/312 |
| 2015/0341837 A1* | 11/2015 | Zhao | H04W 48/18 455/436 |
| 2016/0044593 A1 | 2/2016 | Anpat et al. | |
| 2016/0100326 A1* | 4/2016 | Chandramouli | H04W 8/26 370/241.1 |
| 2016/0227590 A1* | 8/2016 | Huang | H04W 60/00 |
| 2018/0049156 A1* | 2/2018 | Laha | H04W 4/06 |
| 2018/0077714 A1* | 3/2018 | Kodaypak | H04W 76/00 |
| 2018/0084556 A1* | 3/2018 | Guo | H04W 8/06 |

OTHER PUBLICATIONS

3GPP TS 23.060 V14.2.0 (Dec. 2016) Technical Specification: 3rd Generation Partnership Project; Technical Specification Group Services and System Aspects; General Packet Radio Service (GPRS); Service description; Stage 2 (Release 14), 3GPP, 650 Route des Lucioles—Sophia Antipolis Valbonne—France, Dec. 2016; 367 pages.

3GPP TS 23.204 V13.1.0 (Jun. 2016) Technical Specification: 3rd Generation Partnership Project; Technical Specification Group Services and System Aspects; Support of Short Message Service (SMS) over generic 3GPP Internet Protocol (IP) access; Stage 2 (Release 13), 3GPP, 650 Route des Lucioles—Sophia Antipolis Valbonne—France, Jun. 2016, 59 pages.

3GPP TS 23.401 V14.2.0 (Dec. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 14), 3GPP, 650 Route des Lucioles—Sophia Antipolis Valbonne—France, Dec. 2016; 385 pages.

3GPP TS 23.682 V14.2.0 (Dec. 2016) Technical Specification: 3rd Generation Partnership Project; Technical Specification Group Services and System Aspects; Architecture enhancements to facilitate communications with packet data networks and applications (Release 14), 3GPP, 650 Route des Lucioles—Sophia Antipolis Valbonne—France, Dec. 2016; 104 pages.

3GPP TS 29.368 V14.0.0 (Dec. 2016) Technical Specification: 3rd Generation Partnership Project; Technical Specification Group Core Network and Terminals; Tsp interface protocol between the MTC Interworking Function (MTC-IWF) and Service Capability Server (SCS) (Release 14), 3GPP, 650 Route des Lucioles—Sophia Antipolis Valbonne—France, Dec. 2016; 33 pages.

Wireless Moves, "Cellular-IoT—Part 7—to IP or Not to IP—That is the Question!" Sep. 2016; 4 pages.

"ETSI TS 123 401 V13.6.1 (May 2016) Technical Specification: LTE; General Packet Radio Service (GPRS) enhancements for Evolved Universal Terrestrial Radio Access Network (E-UTRAN) access (3GPP TS 23.401 version 13.6.1 Release 13)," ETSI, 650 Route des Lucioles, F-06921 Sophia Antipolis Cedex—France, May 2016; 367 pages.

PCT Notification of Transmittal of the International Search Report and the Written Opinion of the International Searching Authority, or the Declaration for Application No. PCT/US2018/021362 dated Jun. 8, 2018.

\* cited by examiner

US 10,448,243 B2

SYSTEM AND METHOD TO FACILITATE DEVICE TRIGGERING FOR NON-INTERNET PROTOCOL DATA DELIVERY IN A NETWORK ENVIRONMENT

TECHNICAL FIELD

This disclosure relates in general to the field of computer networking, and more particularly, to a system and method to facilitate device triggering for Non-Internet Protocol (Non-IP) Data Delivery (NIDD) in a network environment.

BACKGROUND

Networking architectures have grown increasingly complex in communications environments, particularly mobile wireless environments. Mobile communication networks have grown substantially as different types of user equipment can connect to networks. For example, for the Internet of Things (IoT) many different types of machines can connect to a mobile communication network. In some instances, communications with machine type IoT devices can involve non-IP data delivery. A device capable of communicating via non-IP data is often referred to as Non-IP Data Delivery (NIDD) device. In current deployments, a Machine-Type Communication-Interworking Function (MTC-IWF) is used to trigger communications with NIDD IoT devices when certain error conditions occur. However, the MTC-IWF is costly to deploy and operate in mobile communication networks. Accordingly, there are significant challenges in facilitating Non-IP Data Delivery in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
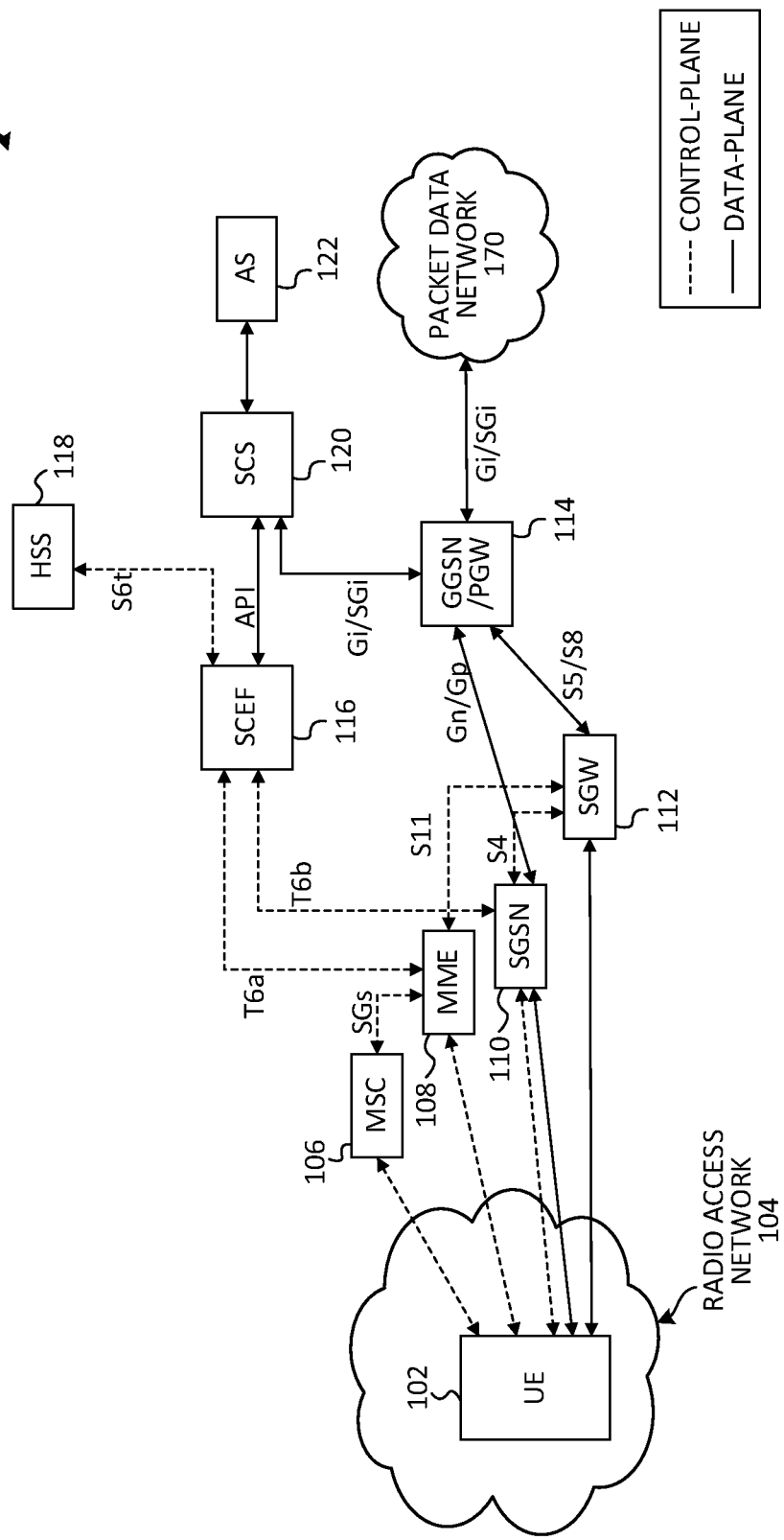
FIG. 1 is a simplified block diagram illustrating a communication system that can facilitate device triggering for Non-IP Data Delivery (NIDD) according to one embodiment of the present disclosure.

A method is provided in one example embodiment receiving, by a Service Capability Exposure Function (SCEF), a request to send data to a user equipment (UE), wherein a context for the UE is not available at the SCEF when the request is received; querying a subscriber database to determine whether the context for the UE is available at the subscriber database; and sending the data for the UE to a Mobility Management Entity (MME) by the SCEF using an interface directly interconnecting the MME and the SCEF based on a determination that the context for the UE is available at the subscriber database. The interface directly interconnecting the MME and the SCEF can be a 3rd Generation Partnership Project (3GPP) T6a interface. In some cases, the subscriber database can be a Home Subscriber Server (HSS) and wherein the querying is performed using an external identifier or a Mobile Station International Subscriber Directory Number (MSISDN) associated with the UE.

In some instances, sending the data for the UE can further include sending a Diameter-based message to the MME using the interface and sending the data to the UE from the MME. In some instances, sending the data for the UE can further include sending a Diameter-based message to the MME using the interface, wherein the Diameter-based message includes, at least in part, a flag indicating that the data is to be sent to the UE using a Short Message Service (SMS). In still some instances, the method can include determining at the MME that the data is to be sent to the UE using SMS device triggering based on the flag; sending the data to a Mobile-services Switching Centre (MSC) from the MME; and sending the data to the UE from the MSC using an SMS message. In still some instances, the method can include sending a notification to a Service Capability Server (SCS) that the UE is not found based on no context being available for the UE in the subscriber database.

Example Embodiments

For purposes of understanding certain embodiments of systems and architectures disclosed herein, it is important to appreciate the technologies and data that may be associated with Non-IP Data Delivery (NIDD) for IoT devices. Such information is offered earnestly and for teaching purposes only and, therefore, should not be construed in a way to limit the broad applications and teachings of the present disclosure. In various embodiments, network communications associated with NIDD can be associated with different 3rd Generation Partnership Project (3GPP) architectures such as, for example, Global System for Mobile Communications (GSM) Enhanced Data Rates for GSM Evolution (EDGE) Radio Access Network (GERAN), generally referred to as 2nd Generation (2G); Universal Mobile Telecommunications System (UMTS) Terrestrial Radio Access Network (UTRAN), generally referred to as 3G; evolved-UTRAN (E-UTRAN), generally referred to as 4G, Long Term Evolution (LTE), LTE-Advanced (LTE-A) and/or LTE-A Pro; and/or 5th Generation (5G) New Radio (NR) or beyond. Generally, 4G/LTE architectures can be associated with an LTE Evolved Packet Core (EPC) network architecture. An LTE EPC can also be referred to interchangeably as an Evolved Packet System (EPS).

As referred to herein, an IoT device can be referred to as a user equipment (UE) and can be associated with any electronic device for which a flow can be initiated via some network. The terms 'UE', 'mobile device', 'mobile radio device', 'end device', 'user', 'subscriber' or variations thereof can be used herein in this Specification interchangeably and can be inclusive of devices used to initiate a communication, such as a computer, an electronic device such as an (IoT) device (e.g., an appliance, a thermostat, a sensor, a parking meter, a machine, etc.), a personal digital assistant (PDA), a laptop or electronic notebook, a cellular telephone, an IP phone, an electronic device having cellular and/or Wi-Fi connection capabilities, a wearable electronic device or any other device, component, element, or object capable of initiating voice, audio, video, media, or data exchanges within a communication system. A UE may also be inclusive of a suitable interface to a human user such as a microphone, a display, a keyboard, or other terminal equipment.

A UE may also be any device that seeks to initiate a communication on behalf of another entity or element such as a program, application, a database, or any other component, device, element, or object capable of initiating an exchange within a communication system.

In various embodiments, a given UE can be identified using one or more identifiers such as, for example, an International Mobile Subscriber Identity (IMSI), a Mobile Station International Subscriber Directory Number (MSISDN) or an External Identifier, which can be a globally unique identifier that maps to an IMSI for a UE.

As referred to herein in this Specification, the term 'plane' can refer to a separation of traffic that can traverse a network. Three planes can typically be found in communication networks including: a data-plane, a control-plane and a management-plane. The data-plane typically carries or forwards user traffic, while the control-plane typically carries signaling traffic used to provide routing information for user traffic and the management-plane, a subset of the control plane, typically carries administrative traffic. As referred to herein in this Specification, the terms 'user-plane', 'data-plane' and 'user data-plane' can be used interchangeably.

Communications in a network environment are referred to herein as 'messages', 'messaging' and/or 'signaling', which may be inclusive of packets. Generally, signaling is referred to in reference to control-plane or management-plane packets while messaging can be referred to in reference to control-plane, management-plane or data-plane packets exchanged for communications at the application level.

A packet is a formatted unit of data and can contain both control information (e.g., source and destination address, etc.) and data, which is also known as payload (e.g., a trigger payload). In some embodiments, control information can be included in headers and trailers for packets. Messages can be sent and received according to any suitable communication protocols. Suitable communication protocols can include a multi-layered scheme such as the Open Systems Interconnection (OSI) Model, or any derivations or variants thereof.

The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

3GPP Technical Specification (TS) 23.682 defines features for the Machine-Type Communication-Interworking Function (MTC-IWF) network functionality. The primary functionality of the MTC-IWF is to offer device triggering functionality for NIDD IoT devices (e.g., UE). In general, device triggering, as defined by 3GPP TS 23.612, Section 4.5.1, is the process by which a Services Capability Server (SCS) sends information to a given UE via a 3GPP network. The information can be sent to the UE to trigger the UE to perform various application specific actions. In various embodiments, these actions can include initiating communication with the SCS or with an Application Server (AS) in communication with the SCS. Device triggering is needed when an Internet Protocol (IP) address for the given UE is not available or is not reachable by the SCS and/or the AS. A device triggering message can include information that enables the network to route the message to a given UE and the given UE to associate or route the message to an appropriate application. Information included in the message can include a trigger payload that enables the UE to route the message to the appropriate application and to perform operations via the application.

In current MTC-IWF deployments, the 3GPP MTC-IWF interfaces, via a 3GPP T4 interface, with a Short Message Service-Service Centre (SC)/Gateway Mobile-services Switching Centre (MSC)/Interworking MSC (SMS-SC/GMSC/IWMSC) to facilitate NIDD to IoT devices (e.g., UEs) using SMS device triggering as described in 3GPP TS 23.682, Section 5.2.2. The SMS-SC/GMSC/IWMSC can interface with an MSC, a Mobility Management Entity (MME) and/or a Serving GPRS Support Node (SGSN) to send an SMS to a given UE for device triggering.

As described in 3GPP TS 23.682, Section 5.13.3 at Step 2, SMS device triggering is initiated in current deployments by the MTC-IWF towards the UE via the T4 interface for cases in which the SCEF to which the MTC-IWF interfaces determines that it does not have an EPS bearer context stored for a UE to which non-IP data is to be delivered. In various instances, certain error conditions such as, for example, an SCEF restarting or internal SCEF errors occurring can cause an SCEF to lose EPS bearer context for one or more UE. While such errors are infrequent, under current 3GPP standards-based procedures an MTC-IWF is needed to perform device triggering when such errors do occur. However, deploying an MTC-IWF in a communication system can result in a network operator incurring a large operational and capital cost merely to achieve device triggering functionality.

In general, a 'bearer' can refer to a path, channel, tunnel or the like through which communications can be exchanged between two endpoints for a particular service, application, etc. Typically, EPS bearers are referred to in association to communications exchanged between a UE and one or more nodes of the EPC. At a minimum, a default EPS bearer is established for a given UE, as defined in 3GPP standards, upon initial attachment of the UE to a given Radio Access Network (RAN) Radio Frequency (RF) element. In some embodiments, one or more dedicated EPS bearers can be established for a given UE for one or more specialized services or applications provided to the UE such as, for example, a VoLTE session, a data session, a Voice over IP (VoIP) session, a gaming session, an MTC application session, combinations thereof or the like. An EPS bearer can be identified using an EPS bearer identifier (ID).

Referring to FIG. 1, FIG. 1 is a simplified block diagram illustrating a communication system 100 that can, in various embodiments as described herein, provide a system and method to facilitate device triggering for Non-IP Data Delivery (NIDD) without involving MTC-IWF functionality. Communication system 100 can include a user equipment (UE) within a Radio Access Network (RAN) 104, a Mobile-services Switching Centre (MSC) 106, a Mobility Management Entity (MME) 108, a Serving GPRS Support Node (SGSN) 110, a Serving Gateway SGW) 112, a combined Gateway GPRS Support Node (GGSN) and Packet Data Network (PDN) Gateway (PGW) 114, a Service Capability Exposure Function (SCEF) 116, a Home Subscriber Server (HSS) 118, a Services Capability Server (SCS) 120, an Application Service 122 and a PDN 170. No MTC-IWF is illustrated for the embodiment of FIG. 1.

Each of the elements of the embodiment of FIG. 1 may couple to one another through simple interfaces or through any other suitable connection (wired or wireless), which may provide a viable pathway for network communications. As referred to herein, a physical (wired or wireless) interconnection or interface can refer to an interconnection of one element, node, function, etc. with one or more other element(s), node(s), function(s), etc. while a logical interconnection or interface can refer to communications, interactions and/or operations of elements, nodes, functions, etc. with each other that can be directly or indirectly interconnected in a network environment.

UE 102 can interface with: MSC 106 via a 3GPP control-plane (dashed-line) interface; MME 108 via a 3GPP control-plane interface; SGSN 110 via a 3GPP control-plane and a 3GPP data-plane interface; and SGW 112 via a 3GPP data-plane (solid-line) interface. RAN 104 can provide communications interfaces between UE 102 and MSC 106, MME 108, SGSN 110 and SGW 112 via one or more Radio Frequency (RF) elements to which UE can be connected via over-the-air (OTA) RF communications for various access networks as prescribed by 3GPP standards. RF elements are not shown in the FIG. 1 in order to illustrate other features of communication system 100.

MSC 106 can further interface with MME via a 3GPP SGs control-plane interface. MME 108 can further interface with SCEF 116 via a 3GPP T6a control-plane interface and with SGW 112 via a 3GPP S11 control-plane interface. SGSN 110 can further interface with SCEF via a 3GPP T6b control-plane interface and with SGW 112 via a 3GPP control-plane interface. SGSN 110 can further interface with SGW 112 via 3GPP S4 control- and data-plane interfaces (note; only the data-plane interface is illustrated). SGSN 110 can further interface with GGSN/PGW 114 via 3GPP Gn and/or Gp control- and data-plane interfaces (note, only the data-plane interface is illustrated). Although not shown, SGSN 110 and the MME 108 can interface via a 3GPP S3 control-plane interface. SGW 112 can further interface with GGSN/PGW 114 via S5 and/or S8 control and data-plane interfaces (note; only the data-plane interface(s) are illustrated). In general, the S8 interface is used when a UE is roaming between different network operators and the S5 interface is a network internal interface for a given network operator.

SCEF 116 can further interface with HSS via a 3GPP S6t control-plane interface and with SCS 120 via an Application Programming Interface (API), which can be defined by 3GPP standards or can be vendor specific depending on needs and implementations. SCS 120 and SGSN/PGW 114 can interface via 3GPP Gi and/or SGi data-plane interface(s). GGSN/PGW 114 can further interface with PDN 170 via 3GPP Gi and/or SGi data-plane interface(s). SCS 120 can further interface with AS 122 via a 3GPP or vendor specific data-plane interface depending on needs and implementations. Generally, interfaces can represent reference points for certain communication protocols that can be used to facilitate communications in a network environment as generally provided in 3GPP Technical Specifications (TS) such as, for example, TS 23.002, TS 23.060, 23.401, etc. Elements of communication system 100 may be provisioned with any interfaces, which can be 3GPP-based and/or vendor specific to facilitate the exchange of communications within communication system 100.

For SCEF-based device triggering embodiments described herein, SCEF 116 and MME 108 can be enhanced to provide device triggering functionality without needing an MTC-IWF deployed in the communication system. SCEF-based device triggering embodiments described herein can be performed using one of two potential solutions. A first solution can involve a method to facilitate device triggering by SCEF 116 using a Mobile Terminated (MT) device triggering procedure via MME 108. A second solution can involve a method to facilitate device triggering by SCEF 116 using an SMS device triggering procedure via MSC 106.

Mobile Terminated Device Triggering

During operation, to facilitate device triggering for NIDD without involving MTC-IWF functionality according to the first MT device triggering solution, operations can include SCS 120 and/or AS 122 (referred to herein using the term SCS/AS 120/122) initiating device triggering using a NIDD Submit Request message communicated to SCEF 116. The NIDD Submit Request can include, among other information, a globally unique External Identifier that maps to an IMSI associated with UE 102 or the MSISDN for the UE and non-IP data that is to be delivered to the UE. Upon receiving the NIDD Submit Request, SCEF 116 can determine whether it has an EPS bearer context stored for UE by performing a lookup using the External Identifier or the MSISDN on an SCEF EPS bearer context table maintained at the SCEF.

An EPS bearer context for a given UE can provide various information including, but not limited to, an IMSI for the UE, an MSISDN for the UE, an External Identifier for the UE, an Access Point Name (APN), a NIDD charging identifier (ID) for the UE, an EPS Bearer ID associated with an EPS bearer for the UE, serving node information, a Public Land Mobile Network (PLMN) ID, an International Mobile Equipment Identity software version (IMEISV), rate control information, combinations thereof or the like as may be defined by 3GPP standards. For embodiments described herein, the term 'User Identity' and variations thereof can refer to any of an IMSI, an MSISDN and/or an External Identifier that can be used to identify a given UE.

If the SCEF 116 has an EPS bearer context stored for the UE 102, the SCEF sends a Diameter-based NIDD Submit Request message to MME 108 using the T6a interface that includes, among other information, the User Identity (ID) (e.g., IMSI, MSISDN or External Identifier) for the UE, an EPS bearer ID for the UE session and the non-IP data. In one embodiment, the NIDD Submit Request sent from SCEF 116 can be enhanced to include a new SMS flag. In at least one embodiment, an SMS flag can be provisioned as one or more bit(s) that can be set in an NIDD Submit Request message, either within the message itself or within a new SMS Information Element (IE) that can be appended, tagged or otherwise included with an NIDD Submit Request message.

SCEF 116 may set or not set the SMS flag to indicate to the MME 108 whether the MME should perform device triggering via MT device triggering (e.g., SMS flag is not set) or via SMS device triggering (e.g., SMS flag is set). MME 108 can be enhanced to include functionality to parse the SMS flag to determine appropriate device triggering for a given NIDD Submit Request received from SCEF 116.

For the MT device triggering procedure, SCEF 116 would not set the SMS flag for the NIDD Submit Request message sent to MME 108. Upon receiving the NIDD Submit Request, MME can check the SMS flag to determine whether it is set. Based on a determination that the SMS flag is not set, the MME 108 can perform NIDD delivery of the non-IP data to UE 102 as defined by 3GPP standards. If the UE is in an IDLE mode, the delivery operations can include the MME paging the UE to transition the UE to an ACTIVE mode before delivering the data to the UE.

However, if SCEF 116 determines that it does not have an EPS bearer context stored for the UE 102, SCEF 116 can query HSS 118 for the EPS bearer context for UE 102 using the External Identifier or the MSISDN for the UE as received from the SCS/AS 120/122. Recall, in current deployments, if a SCEF determines that it does not have an EPS bearer context for a UE to which non-IP data is to be delivered, the MTC-IWF initiate's device triggering toward the UE via the T4 interface interconnecting the MTC-IWF and the MME. MTC-IWF SMS triggering is not needed for embodiments described herein. Rather, SCEF 116 is enhanced with functionality to query HSS 118 for an EPS bearer context for a UE to which non-IP data is to be delivered.

HSS 118 can determine whether it has a stored context for the UE by performing a lookup on an HSS EPS bearer context table maintained at the HSS 118 using the External Identifier or the MSISDN received for the UE from the SCEF 116. If the context for the UE is available at the HSS, the HSS 118 can respond to SCEF with the EPS bearer context for the UE. If no context for the UE is available at the HSS, the HSS can respond with a failure indication. If SCEF 116 receives a failure indication from HSS 118 in response to the query, SCEF 116 can respond to the Submit Request received from SCS/AS 120/122 with a NIDD Submit Response that can be enhanced to carry an indication that the UE is not served in the network (e.g., a UE_NOT_FOUND flag or cause can be included in the response).

If the SCEF 116 receives the EPS bearer context for the UE 102 from HSS 118, the SCEF 116 sends a Diameter-based NIDD Submit Request message to MME 108 using the T6a interface that includes, among other information, the User Identity for UE 102, an EPS bearer ID for the UE, the non-IP data and the SMS flag not set. Upon receiving the message, MME 108 can check the SMS flag to determine whether the SMS flag is set. Based on a determination that the SMS flag is not set, the MME 108 can perform NIDD delivery of the non-IP data to UE 102 as discussed above.

Accordingly, an MT device triggering procedure can be facilitated by communication system 100 via enhanced SCEF 116 and MME 108 for NIDD without the need of an MTC-IWF in accordance with at least one embodiment of the communication system.

SMS Device Triggering

During operation, to facilitate device triggering for NIDD without involving MTC-IWF functionality according to the second SMS device triggering solution, operations can also include SCS/AS 120/122 initiating device triggering using a NIDD Submit Request message communicated to SCEF 116. As discussed previously, the NIDD Submit Request received from the SCS/AS can include, among other information, an External Identifier or MSISDN associated with UE 102 and non-IP data that is to be delivered to the UE. Upon receiving the NIDD Submit Request, SCEF 116 can determine whether it has an EPS bearer context stored for UE by performing a lookup using the External Identifier or the MSISDN on the SCEF EPS bearer context table maintained by the SCEF.

If the SCEF 116 determines that it has an EPS bearer context stored for the UE 102, the SCEF sends a Diameter-based NIDD Submit Request message to MME 108 using the T6a interface that includes, among other information, the User Identity (ID) (e.g., IMSI, MSISDN or External Identifier) for the UE, an EPS bearer ID for the UE session, the non-IP data and the SMS flag set to indicate that SMS device triggering is to be performed via MSC 106. Upon receiving the NIDD Submit Request, MME 108 can check the SMS flag to determine whether it is set. Based on a determination that the SMS flag is set, the MME 108 can forward the message to MSC 106 via the SGs control-plane interface and the MSC 106 can initiate SMS device triggering toward the UE 102 using 3GPP standards-based procedures.

However, if SCEF 116 determines that it does not have an EPS bearer context stored for the UE 102, SCEF 116 can query HSS 118 for the EPS bearer context for UE 102 using the External identifier or the MSISDN for the UE as received from the SCS/AS 120/122. HSS 118 can determine whether it has a stored context for the UE by performing a lookup on an HSS EPS bearer context table maintained at the HSS using the External Identifier or the MSISDN received for the UE from SCEF 116. If the context for the UE is available at the HSS, the HSS can respond to SCEF with the EPS bearer context for the UE. If no context for the UE is available at the HSS, the HSS can respond with a failure indication. Upon receiving a failure indication the HSS, SCEF 116 can respond to the Submit Request received from SCS/AS 120/122 with a NIDD Submit Response that can be enhanced to carry an indication that the UE is not served in the network (e.g., a UE_NOT_FOUND flag or cause can be included in the response).

If the SCEF 116 receives the EPS bearer context for the UE 102 from HSS 118, the SCEF 116 sends a Diameter-based NIDD Submit Request message to MME 108 using the T6a interface that includes, among other information, the User Identity for UE 102, an EPS bearer ID for the UE, the non-IP data and the SMS flag being set. Upon receiving the message, MME 108 can check the SMS flag to determine whether the SMS flag is set. Based on a determination that the SMS flag is set, the MME 108 can send a Submit Trigger message to MSC 106 via the SGs control-plane interface and the MSC 106 can initiate SMS device triggering toward the UE 102 using 3GPP standards-based procedures.

Accordingly, an SMS device triggering procedure can be facilitated by communication system 100 via enhanced SCEF 116 and MME 108 for NIDD without the need of an MTC-IWF in accordance with at least one embodiment of the communication system.

Variations and Implementations

In regards to the example architecture of communication system 100, communication system 100 may, in various embodiments, implement User Datagram Protocol/Internet Protocol (UDP/IP) connections and/or Transmission Control Protocol/IP (TCP/IP) connections in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, Terminal Access Controller Access-Control System (TACACS), TACACS+, Proxy Mobile IP version 6 (PMIPv6), Proxy Mobile IP version 4 (PMIPv4), Extensible Messaging and Presence Protocol (XMPP), GPRS Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

In various embodiments, RAN 104 may include 3GPP access networks such as, for example, Global System for Mobile Communications (GSM) Enhanced Data Rates for GSM Evolution (EDGE) Radio Access Network (GERAN), generally referred to as 2nd Generation (2G); Universal Mobile Telecommunications System (UMTS) Terrestrial Radio Access Network (UTRAN), generally referred to as 3G; evolved-UTRAN (E-UTRAN), generally referred to as 4G, Long Term Evolution (LTE), LTE-Advanced (LTE-A), LTE-A Pro; and/or 5th Generation (5G) New Radio (NR) or beyond RANs. In various embodiments, RAN 104 may also include non-3GPP IP access networks such as digital subscriber line (DSL), Cable, a wireless local area network (WLAN) (e.g., 802.11 Wi-Fi), Worldwide Interoperability for Microwave Access (WiMAX)) or the Internet.

In various embodiments, any RF element (not shown) implemented within RAN 104 can be configured as a Node B/Radio Network Controller (nodeB/RNC), an evolved Node B (eNodeB), a Home nodeB (HNB), a Home eNodeB (HeNB), a residential gateway (RG) or any other base station or RF element as may be defined by 3GPP standards to facilitate OTA RF communications with UE and any of MSC 106, MME 108, SGSN 110 and/or SGW 112.

Although only one UE 102 is illustrated for the embodiment of FIG. 1, it should be understood that any number of UE can be present in communication system 100 within the scope of the teachings of the present disclosure. Further, it should be understood that any number of these elements, gateways, nodes, entities, agents, functions, etc. can be deployed for communication system 100 within the scope of the teachings of the present disclosure.

MME 108 is a network element that can provide tracking area list management, IDLE and ACTIVE mode UE management, bearer activation and deactivation, SGW and PGW selection for UE sessions, authentication services and other various functions, services, etc. as prescribed by 3GPP standards. MSC 106 is a network element that can provide switching and mobility services such as SMS exchanges, and/or data calls for legacy-based access networks. SGW 112 is a network element that can provide functionality for managing user mobility and interfaces with RAN nodes (e.g., RF elements). SGSN 110 can provide functionality similar to SGW 112 for legacy-based access networks. PGW 114 is a network element that provides IP connectivity access network (IP-CAN) session connectivity to external PDNs (e.g., PDN 170). PGW 114 may serve as policy and charging enforcement points to manage Quality of Service (QoS) functionality, online/offline flow-based charging, data generation, DPI and intercept within communication system 100. A GGSN can provide functionality similar to a PGW for legacy-based access networks.

HSS 118 can provide a subscriber database to facilitate various network functions. In one sense, HSS 118 can provide functions similar to those offered by a 3GPP Authentication, Authorization and Accounting (AAA) element. A 3GPP AAA element is a network element responsible for accounting, authorization and authentication functions for UE. When a UE moves to 3GPP access, HSS 118 can be aware of this location and the user's PDN anchor point (e.g., PGW 124). As discussed for various embodiments described herein, HSS 118 can store EPS bearer context information for one or more UE (e.g., UE 102) and synchronize this information (e.g., with SCEF 116 via queries from the SCEF) to facilitate non-IP data delivery within communication system 100.

In addition to various features discussed for various embodiments described herein, enhanced SCEF 116 may provide a generic framework to securely expose services and capabilities as may be provided via 3GPP network interfaces to third party applications (e.g., AS 112). The SCEF framework was created to address 3GPP Release 13 (Rel-13) Service Exposure requirements. Application Service (AS) 122 may be provided in a service provider, network operator and/or application provider domain that is external to the 3GPP domain elements of communication system 100 (e.g., SCEF 116, GGSN/PGW 114, SGW 112, MME 108, etc.). In various embodiments, an AS (e.g., AS 122) can host value-added MTC applications (e.g., over-the-top voice services, data services, etc.) external to the 3GPP domain as may be provided by a service provider, network operator and/or application provider and can be used to provision such value-added MTC applications for one or more UE(s).

A UE (e.g., UE 102) can host one or more MTC applications as may be provisioned by one or more AS(s). In various embodiments, operation of AS 122 (e.g., to facilitate NIDD to one or more UE(s)) may be enabled using one or more API procedure calls as may be configured by a service provider, network operator and/or application provider for AS 122, SCS 120 and SCEF 116. The SCS 120 is a network element that provides interconnection between one or more AS(s) (e.g., AS 122) and the SCEF 116 in order to enable AS(s) to communicate with UE(s) using 3GPP defined services. The SCS can offer network services and capabilities that can be used by one or more MTC applications.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network(s) (e.g., packet data network 170). Communication system 100 may offer communicative interfaces between various elements of communication system 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

Within communication system 100, IP addresses for various network elements can be assigned using Dynamic Host Configuration Protocol (DHCP), Stateless Address Autoconfiguration (SLAAC), during default bearer activation processes, or any suitable variation thereof. IP addresses used within communication system 100 can include IP version 4 (IPv4) and/or IP version 6 (IPv6) IP addresses. In various embodiments packet data network (PDN 170) can include, but not be limited to, any combination of the Internet, managed video, and/or any other Access Point Name (APN) to which UE 102 can connect.

Figure 2:
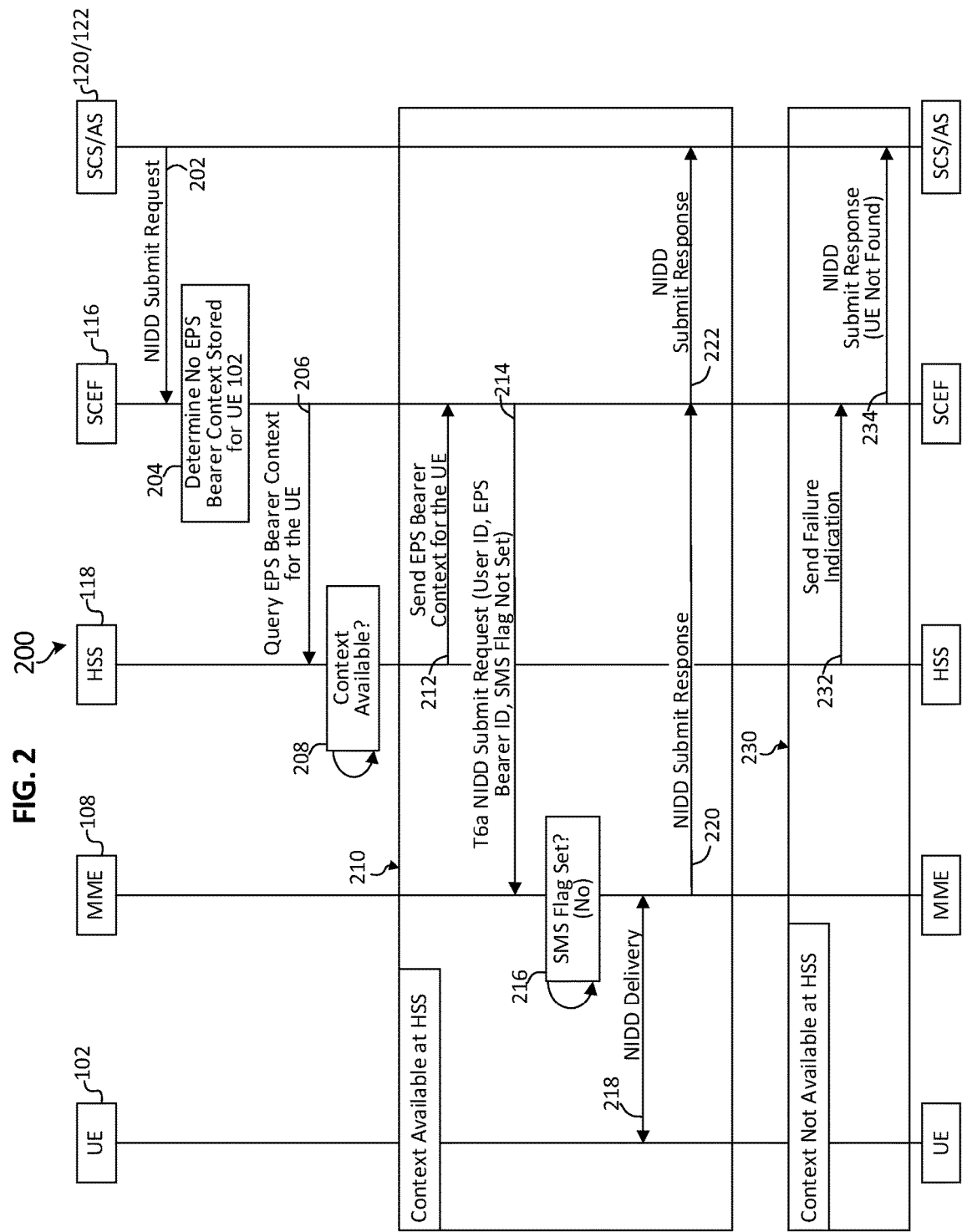
FIG. 2 is a simplified interaction diagram illustrating example details that can be associated with device triggering for NIDD in accordance with one potential embodiment of the communication system.

Referring to FIG. 2, FIG. 2 is a simplified interaction diagram 200 illustrating example details that can be associated with device triggering for NIDD in accordance with one potential embodiment of communication system 100. In particular, the embodiment of FIG. 2 can be associated with MT device triggering for NIDD that can be facilitated via communication system 100. The embodiment of FIG. 2 includes UE 102, MME 108, HSS 118, SCEF 116 and SCS/AS 120/122.

Beginning at 202, SCS/AS 120/122 sends a NIDD Submit Request message to SCEF 116 that includes, at least in part, an External Identifier (Ext. ID) or an MSISDN associated with UE 102 and non-IP data to be delivered to UE 102 for an MTC application hosted on the UE. In some embodiments, the SCS/AS 120/122 can include the MSISDN for the UE in the Submit Request rather than the External Identifier.

For the embodiment of FIG. 2, it is assumed that SCEF 116 determines at 204 that it has no EPS bearer context stored for UE 102 (e.g., by performing a lookup on the SCEF EPS bearer context table maintained by the SCEF using the External Identifier or the MSISDN and determining that no bearer context for the UE is available). Based on the determination, SCEF 116 sends a query including the External Identifier or the MSISDN for UE 102 to HSS 118 via the 3GPP S6t interface to request the EPS bearer context for the UE at 206.

At 208, HSS 118 performs a lookup using the External Identifier or the MSISDN on an HSS EPS bearer context table maintained by the HSS to determine whether the EPS bearer context is available for UE 102. The embodiment of FIG. 2 illustrates operations (210) that can be performed based on a determination by HSS 118 that the EPS bearer context for UE 102 is available at the HSS and other operations (230) that can be performed based on a determination by HSS 118 that the EPS bearer context for UE 102 is not available at the HSS.

For operations (210) based on a determination by HSS 118 that the EPS bearer context for UE 102 is available at the HSS, HSS 118 responds (212) to the SCEF 116 query with the EPS bearer context for UE 102. The EPS bearer context for the UE can include, at least in part, a User Identity (User ID) for UE 102 (e.g., IMSI, MSISDN or External Identifier) and an EPS bearer ID for the UE 102 session. Based on the response from the HSS, SCEF 116 sends a T6a NIDD Submit Request message to MME 108 at 214 that includes, at least in part, the User Identity for UE 102, the EPS bearer ID for the UE 102 session and the SMS flag not set to indicate MT device triggering to the MME.

Upon receiving the NIDD Submit Request, MME 108 determines at 216 whether the SMS flag is set, which, for the embodiment of FIG. 2, it is assumed that the flag is not set for the message sent from SCEF 116 to MME 108. Based on a determination by MME 108 that the SMS flag is not set, the MME performs NIDD procedures at 218 as may be prescribed by 3GPP standards in order to deliver the non-IP data to UE 102. MME 108 sends a NIDD Submit Response message to SCEF 116 at 220 acknowledging the NIDD Submit Request received at 214. In some embodiments, UE 102 can be provisioned to acknowledge receipt of data delivered to the UE. For such embodiments, assuming that UE 102 acknowledges delivery of non-IP data from MME 108, the MME can include a cause code set to indicate successful delivery of the data to the UE. Otherwise, if delivery is not successful, the UE can indicate such to the MME. At 222, SCEF 116 relays the NIDD Submit Response to ACS/AS 120/122.

For operations (230) based on a determination that the EPS bearer context for UE 102 is not available at the HSS, HSS 118 responds (232) to the SCEF 116 query with a failure indication. Upon receiving the response, SCEF 116 sends an NIDD Submit Response message to SCS/AS 120/122 at 234 that includes an indication that the UE was not found in the network.

Accordingly, as illustrated by the embodiment of FIG. 2, an MT device triggering procedure can be facilitated by communication system 100 via enhanced SCEF 116 and MME 108 for NIDD to UE 102 without needing the functionality of an MTC-IWF.

Figure 3:
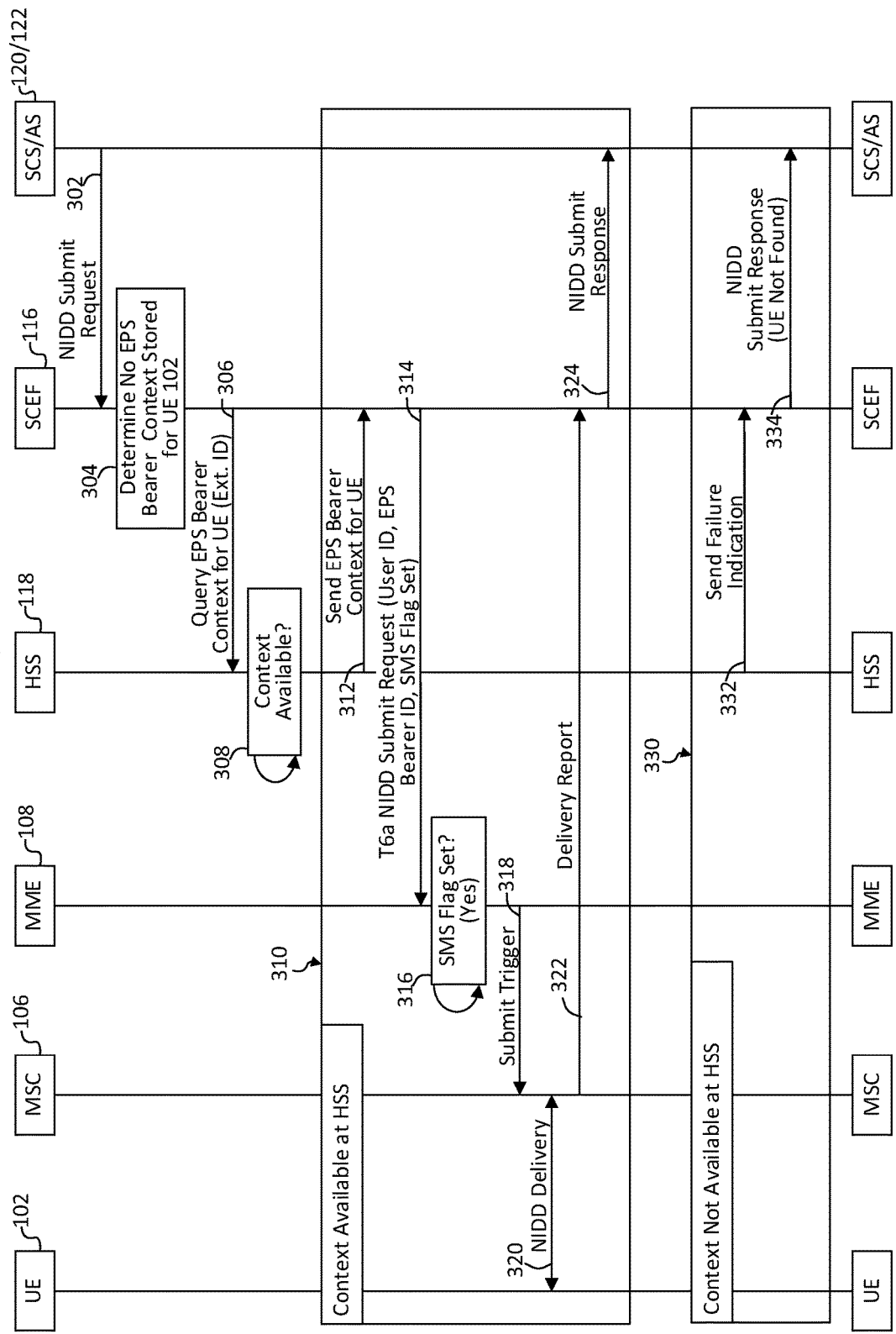
FIG. 3 is a simplified interaction diagram illustrating other example details that can be associated with device triggering for NIDD in accordance with one potential embodiment of the communication system.

Referring to FIG. 3, FIG. 3 is a simplified interaction diagram 300 illustrating example details that can be associated with device triggering for NIDD in accordance with one potential embodiment of communication system 100. In particular, the embodiment of FIG. 3 can be associated with SMS device triggering for NIDD that can be facilitated via communication system 100. The embodiment of FIG. 3 includes UE 102, MSC 106, MME 108, HSS 118, SCEF 116 and SCS/AS 120/122.

Beginning at 302, SCS/AS 120/122 sends a NIDD Submit Request message to SCEF 116 that includes, at least in part, an External Identifier or an MSISDN associated with UE 102 and non-IP data to be delivered to UE 102 for an MTC application hosted on the UE. For the embodiment of FIG. 3, it is assumed that SCEF 116 determines at 304 that it has no EPS bearer context stored for UE 102 (e.g., by performing a lookup on the SCEF EPS bearer context table maintained by the SCEF using the External Identifier or the MSISDN and determining that no bearer context for the UE is available). Based on the determination, SCEF 116 sends a query including the External Identifier or the MSISDN for UE 102 to HSS 118 via the 3GPP S6t interface to request the EPS bearer context for the UE at 306.

At 308, HSS 118 performs a lookup using the External Identifier or the MSISDN on an HSS EPS bearer context table maintained by the HSS to determine whether the EPS bearer context is available for UE 102. The embodiment of FIG. 3 illustrates operations (310) that can be performed based on a determination by HSS 118 that the EPS bearer context for UE 102 is available at the HSS and other operations (330) that can be performed based on a determination by HSS 118 that the EPS bearer context for UE 102 is not available at the HSS.

For operations (310) based on a determination by HSS 118 that the EPS bearer context for UE 102 is available at the HSS, HSS 118 responds (312) to the SCEF 116 query with the EPS bearer context for UE 102. The EPS bearer context for the UE can include, at least in part, a User Identity (User ID) for UE 102 (e.g., IMSI, MSISDN or Ext. ID) and an EPS bearer ID for the UE 102 session. Based on the response from the HSS, SCEF 116 sends a T6a NIDD Submit Request message to MME 108 at 314 that includes, at least in part, the User Identity for UE 102, the EPS bearer ID for the UE 102 session and the SMS flag set to indicate SMS device triggering to the MME.

Upon receiving the NIDD Submit Request, MME 108 determines at 316 whether the SMS flag is set, which, for the embodiment of FIG. 3, it is assumed that the flag is set for the message sent from SCEF 116 to MME 108. Based on a determination by MME 108 that the SMS flag is set, the MME sends a Submit Trigger message to MSC 106 via the SGs interface at 318. The Submit Trigger message can include, at least in part, the External Identifier or MSISDN for UE 102, the IMSI for UE 102, a trigger payload (e.g., the non-IP data), MTC application information, and a Trigger Indication that allows the UE and the MSC to distinguish an MT message that includes device triggering information from other types of messages. At 320, MSC 106 performs NIDD procedures as may be prescribed by 3GPP standards in order to deliver the non-IP data to UE 102.

At 322, a Delivery Report message is relayed from MSC 106 via MME 108 to SCEF 116. In various embodiments, the Delivery Report can include a Charging Data Record (CDR), a Trigger Indication to differentiate charging for the SMS non-IP data delivery, Delivery Status Information indicating whether the non-IP data delivery was successful, combinations thereof or the like. At 324, the SCEF 116 sends a NIDD Submit Response message to SCS/AS 120/122. In some embodiments, the Submit Response message can include a cause code set to indicate whether the non-IP data delivery was successful.

For operations (330) based on a determination that the EPS bearer context for UE 102 is not available at the HSS, HSS 118 responds (332) to the SCEF 116 query with a failure indication. Upon receiving the response, SCEF 116 sends an NIDD Submit Response message to SCS/AS 120/122 at 334 that includes an indication that the UE was not found in the network.

Accordingly, as illustrated by the embodiment of FIG. 3, an SMS device triggering procedure can be facilitated by communication system 100 via enhanced SCEF 116 and MME 108 for NIDD to UE 102 without needing the functionality of an MTC-IWF.

Figure 4:
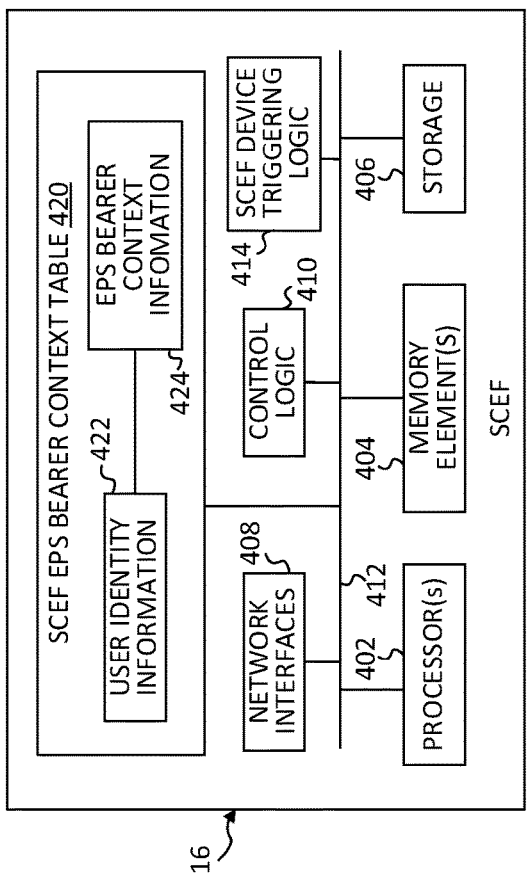
FIGS. 4-7 are simplified block diagrams illustrating example details that can be associated with various potential embodiments of the communication system.

Referring to FIG. 4, FIG. 4 is a simplified block diagram illustrating example details that can be associated with SCEF 116 in accordance with one potential embodiment of communication system 100. In at least one embodiment, SCEF 116 can include one or more processor(s) 402, one or more memory element(s) 404, storage 406, network interfaces 408, control logic 410, a bus 412, SCEF device triggering logic 414 and an SCEF EPS bearer context table 420.

In at least one embodiment, processor(s) 402 is/are at least one hardware processor configured to execute various tasks, operations and/or functions for SCEF 116 as described herein according to software and/or instructions configured for SCEF 116. In at least one embodiment, memory element(s) 404 and/or storage 406 is/are configured to store data, information, software, and/or instructions associated with SCEF 116 and/or logic configured for memory element(s) 404 and/or storage 406 (e.g., control logic 410 and/or SCEF device triggering logic 414 can, in various embodiments, be stored using any combination of memory element(s) 404 and/or storage 406). In at least one embodiment, bus 412 can be configured as an interface that enables one or more elements of SCEF 116 (e.g., processor(s) 402, memory element(s) 404, logic, network interfaces, etc.) to communicate in order to exchange information and/or data. In at least one embodiment, bus 412 may be implemented as a fast kernel-hosted interconnect, potentially using shared memory between processes (e.g., logic, etc.), which can enable efficient communication paths between the processes.

In various embodiments, network interfaces 408 enable communication between SCEF 116 and other network elements that may be present in communication system 100 (e.g., HSS 118, MME 108, SCS 120, etc.) to facilitate operations discussed for various embodiments described herein. In some embodiments, network interfaces 408 can include one or more Ethernet driver(s) and/or controller(s), Fibre Channel driver(s) and/or controller(s), and/or other similar network interface driver(s) and/or controller(s) to enable communications for SCEF 116 within communication system 100.

In various embodiments, memory element(s) 404 and/or storage 406 can be configured to store: SCEF EPS bearer context table 420; any other information that may facilitate device triggering operations as discussed for embodiments described herein (e.g., interface information, port information, address information, etc.); logic; any other data, information, software and/or instructions as discussed for various embodiments described herein; combinations thereof; or the like. Note that in some embodiments, storage can be consolidated with memory elements (or vice versa), or can overlap/exist in any other suitable manner.

SCEF EPS bearer context table 420 may be provisioned for SCEF 116 to enable the SCEF to perform device triggering operations as discussed for various embodiments described herein. SCEF EPS bearer context table 420 can include User Identity information 422 (e.g., External Identifiers, MSISDNs and/or IMSIs) for one or more UE mapped or associated to EPS bearer context information 424 for each corresponding UE. In various embodiments, SCEF EPS bearer context table 420 can be separate from other elements (e.g., logic, etc.) of SCEF 116 or could be integrated with one or more of the elements based on particular needs and implementations. Other data structures can be maintained by SCEF 116 according to various needs and/or implementations of the SCEF.

In various embodiments, SCEF device triggering logic 414 can include instructions that, when executed (e.g., by processor(s) 402) cause SCEF 116 to perform device triggering operations, which can include, but not be limited to: receiving NIDD Submit Requests for delivery of non-IP data to one or more UE (e.g., UE 102); determining whether EPS bearer context is available for a given UE for which a Submit Request is received; querying an HSS (e.g., HSS 118) to determine the EPS bearer context for a UE if no such context is currently available at the SCEF; initiating MT or SMS device triggering toward an MME (e.g., MME 108) and/or MSC (e.g., MSC 106) upon receiving EPS bearer context for a UE from the HSS, including setting or not setting an SMS flag for such messaging; exchanging other communications between an MME and an SCS and/or Application Service as discussed for various embodiments described herein; combinations thereof; and/or any other operations as discussed for various embodiments described herein.

In various embodiments, control logic 410 can include instructions that, when executed (e.g., by processor(s) 402) cause SCEF 116 to perform various control operations for the SCEF including, but not limited to: maintaining SCEF EPS bearer context table 420; providing interworking operations (e.g., via APIs, etc.) to securely expose 3GPP network services and capabilities to third party applications (e.g., AS 122) within an SCEF framework as may be prescribed by to 3GPP standards; and/or performing any other operations as may be prescribed by 3GPP standards.

Figure 5:
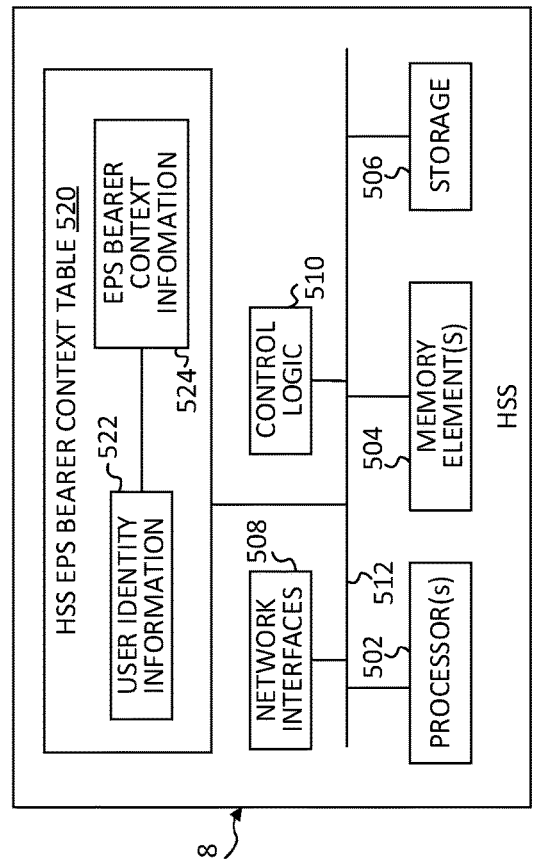

Referring to FIG. 5, FIG. 5 is a simplified block diagram illustrating example details that can be associated with HSS 118 in accordance with one potential embodiment of communication system 100. In at least one embodiment, HSS 118 can include one or more processor(s) 502, one or more memory element(s) 504, storage 506, network interfaces 508, control logic 510, a bus 512, and an HSS EPS bearer context table 520.

In at least one embodiment, processor(s) 502 is/are at least one hardware processor configured to execute various tasks, operations, and/or functions for HSS 118 as described herein according to software and/or instructions configured for HSS 118. In at least one embodiment, memory element(s) 504 and/or storage 506 is/are configured to store data, information, software, and/or instructions associated with HSS 118 and/or logic configured for memory element(s) 504 and/or storage 506 (e.g., control logic 510 can, in various embodiments, be stored using any combination of memory element(s) 504 and/or storage 506). In at least one embodiment, bus 512 can be configured as an interface that enables one or more elements of HSS 118 (e.g., processor(s) 502, memory element(s) 504, logic, network interfaces, etc.) to communicate in order to exchange information and/or data. In at least one embodiment, bus 512 may be implemented as a fast kernel-hosted interconnect, potentially using shared memory between processes (e.g., logic, etc.), which can enable efficient communication paths between the processes.

In various embodiments, network interfaces 508 enable communication between HSS 118 and other network elements that may be present in communication system 100 (e.g., SCEF 116) to facilitate operations discussed for various embodiments described herein. In some embodiments, network interfaces 508 can include one or more Ethernet driver(s) and/or controller(s), Fibre Channel driver(s) and/or controller(s), or other similar network interface driver(s) and/or controller(s) to enable communications for HSS 118 within communication system 100.

In various embodiments, memory element(s) 504 and/or storage 506 can be configured to store: HSS EPS bearer context table 520; any other information that may facilitate operations as discussed for embodiments described herein (e.g., interface information, port information, address information, etc.); logic; any other data, information, software and/or instructions as discussed for various embodiments described herein; combinations thereof; or the like. Note that in some embodiments, storage can be consolidated with memory elements (or vice versa), or can overlap/exist in any other suitable manner.

HSS EPS bearer context table 520 may be provisioned for HSS 118 to enable the HSS to perform operations as discussed for various embodiments described herein. HSS EPS bearer context table 520 can include User Identity information 522 (e.g., External Identifiers, MSISDNs and/or IMSIs) for one or more UE mapped or associated to EPS bearer context information 524 for each corresponding UE. In various embodiments, HSS EPS bearer context table 520 can be separate from other elements (e.g., logic, etc.) of HSS 118 or could be integrated with one or more of the elements based on particular needs and implementations. Other data structures can be maintained by HSS 118 according to various needs and/or implementations of the HSS.

In various embodiments, control logic 510 can include instructions that, when executed (e.g., by processor(s) 502) cause HSS 118 to perform various control operations for the HSS including, but not limited to: maintaining HSS EPS bearer context table 520; exchanging communications with SCEF 116 based on one or more UE EPS bearer queries that may be received from the SCEF; and/or performing any other operations as may be prescribed by 3GPP standards.

Figure 6:
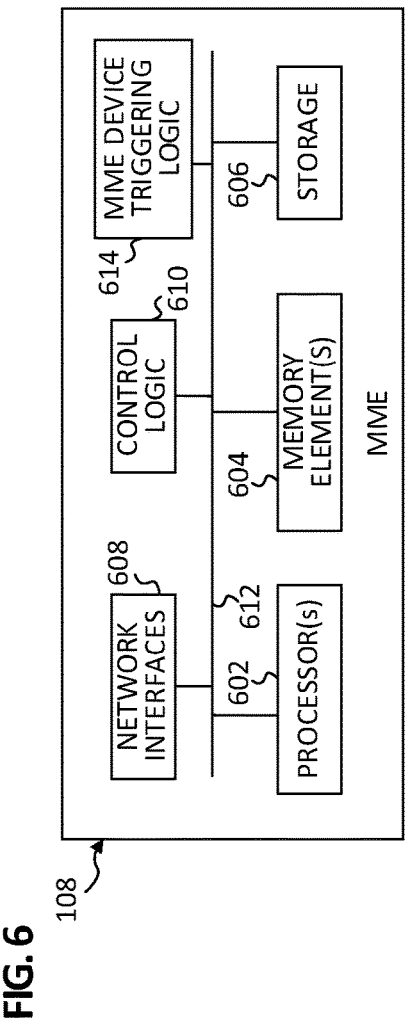

Referring to FIG. 6, FIG. 6 is a simplified block diagram illustrating example details that can be associated with MME 108 in accordance with one potential embodiment of communication system 100. In at least one embodiment, MME 108 can include one or more processor(s) 602, one or more memory element(s) 604, storage 606, network interfaces 608, control logic 610, a bus 612, and MME device triggering logic 614.

In at least one embodiment, processor(s) 602 is/are at least one hardware processor configured to execute various tasks, operations and/or functions for MME 108 as described herein according to software and/or instructions configured for MME 108. In at least one embodiment, memory element(s) 604 and/or storage 606 is/are configured to store data, information, software, and/or instructions associated with MME 108 and/or logic configured for memory element(s) 604 and/or storage 606 (e.g., control logic 610 and/or MME device triggering logic 614 can, in various embodiments, be stored using any combination of memory element(s) 604 and/or storage 606). In at least one embodiment, bus 612 can be configured as an interface that enables one or more elements of MME 108 (e.g., processor(s) 602, memory element(s) 604, logic, network interfaces, etc.) to communicate in order to exchange information and/or data. In at least one embodiment, bus 612 may be implemented as a fast kernel-hosted interconnect, potentially using shared memory between processes (e.g., logic, etc.), which can enable efficient communication paths between the processes.

In various embodiments, network interfaces 608 enable communication between MME 108 and other network elements that may be present in communication system 100 (e.g., SCEF 116, MSC 106, etc.) to facilitate operations discussed for various embodiments described herein. In some embodiments, network interfaces 608 can include one or more Ethernet driver(s) and/or controller(s), Fibre Channel driver(s) and/or controller(s), or other similar network interface driver(s) and/or controller(s) to enable communications for MME 108 within communication system 100.

In various embodiments, memory element(s) 604 and/or storage 606 can be configured to store any information that may facilitate device triggering operations as discussed for embodiments described herein (e.g., interface information, port information, address information, etc.); logic; any other data, information, software and/or instructions as discussed for various embodiments described herein; combinations thereof; or the like. Note that in some embodiments, storage can be consolidated with memory elements (or vice versa), or can overlap/exist in any other suitable manner. Various data structures can be maintained by MME 108 according to various needs and/or implementations of the MME.

In various embodiments, MME device triggering logic 614 can include instructions that, when executed (e.g., by processor(s) 602) cause MME 108 to perform device triggering operations, which can include, but not be limited to: receiving NIDD Submit Requests for delivery of non-IP data to one or more UE (e.g., UE 102); determining whether an SMS flag is set for a given received Submit Request; exchanging SMS device trigger messaging with an MSC (e.g., MSC 106) if an SMS flag is set in a given received Submit Request to carry out SMS device triggering operations; performing MT NIDD procedures for delivering non-IP data to a UE if an SMS flag is not set in a given received Submit Request; combinations thereof; and/or any other operations as discussed for various embodiments described herein.

In various embodiments, control logic 610 can include instructions that, when executed (e.g., by processor(s) 602) cause MME 108 to perform various control operations for the MME including, but not limited to: exchanging other communications between an MSC, SCEF, UE or any other element; and/or performing any other operations as may be prescribed by 3GPP standards.

Figure 7:
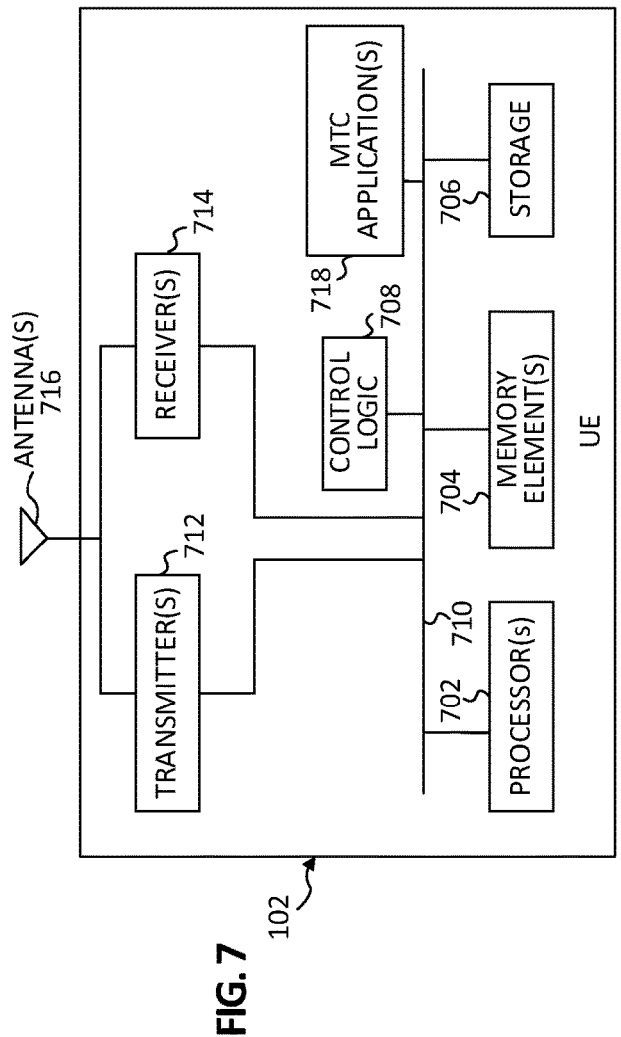

Referring to FIG. 7, FIG. 7 is a simplified block diagram illustrating example details that can be associated with UE 102 in accordance with one potential embodiment of communication system 100. In at least one embodiment, UE 102 can include one or more processor(s) 702, one or more memory element(s) 704, storage 706, control logic 708, a bus 710, one or more transmitter(s) 712, one or more receiver(s) 714 and one or more antenna(s) 716. UE 102 can also be provisioned to host one or more MTC application(s) 718, as instructed via one or more application services (e.g., AS 122) for one or more MTC sessions that may be established for the UE.

In at least one embodiment, processor(s) 702 is/are at least one hardware processor configured to execute various tasks, operations and/or functions for UE 102 described herein according to software and/or instructions configured for UE 102. In at least one embodiment, memory element(s) 704 and/or storage 706 is/are configured to store data, information, software, and/or instructions associated with UE 102 and/or logic configured for memory element(s) 704 and/or storage 706 (e.g., control logic 708 and/or MTC application(s) 718 can, in various embodiments, be stored using any combination of memory element(s) 704 and/or storage 706). In at least one embodiment, bus 710 can be configured as an interface that enables one or more elements of UE 102 (e.g., processor(s) 702, memory element(s) 704, logic, network interfaces, etc.) to communicate in order to exchange information and/or data. In at least one embodiment, bus 710 may be implemented as a fast kernel-hosted interconnect, potentially using shared memory between processes (e.g., logic, etc.), which can enable efficient communication paths between the processes.

In various embodiments, transmitter(s) 712, receiver(s) 714 and antenna(s) enable over-the-air RF communications between UE 102 and other network elements (e.g., RF elements, which may further interface with MSC 106, MME 108, SGSN 110 and SGW 112) that may be present in communication system 100.

In various embodiments, memory element(s) 704 and/or storage 706 can be configured to store any information that may facilitate operations as discussed for embodiments described herein (e.g., interface information, port information, address information, etc.); logic; any other data, information, software, and/or instructions as discussed for various embodiments described herein; combinations thereof; or the like. Note that in some embodiments, storage can be consolidated with memory elements (or vice versa), or can overlap/exist in any other suitable manner. Various data structures can be maintained by UE 102 according to various needs and/or implementations of the UE.

In various embodiments, MTC application(s) 718 can include instructions that, when executed (e.g., by processor(s) 702) cause UE 102 to perform MTC-based operations as instructed by one or more Application Service(s) (e.g., AS 122) and/or an SCS (e.g., SCS 120). In various embodiments, control logic 708 can include instructions that, when executed (e.g., by processor(s) 702) cause UE 102 to perform various control operations for the UE as may be prescribed by 3GPP standards and/or one or more MTC applications hosted by the UE.

In regards to the internal structure associated with communication system 100, each of respective MSC 106, SGSN 110, SGW 112, GGSN/PGW 114, SCS 120, and AS 122 can also include respective at least one processor(s), respective at least one memory element(s), respective at least one storage, respective network interfaces, respective logic, combinations thereof or the like to facilitate device triggering operations for non-IP data delivery in a network environment. Although not shown, it should be understood that any RF elements can also be deployed in communication system 100 to facilitate over-the-air RF communications with one or more UE (e.g., UE 102) and can also include respective processor(s), memory element(s), storage, network interface(s), transmitter(s), receiver(s), logic, combinations thereof or the like to facilitate device triggering operations for non-IP data delivery in a network environment. Hence, appropriate software, hardware and/or algorithms are being provisioned for communication system 100 in order to facilitate operations as discussed for various embodiments described herein to facilitate device triggering operations for non-IP data delivery in a network environment.

In various example implementations, UE 102, MSC 106, MME 108, SGSN 110, SGW 112, GGSN/PGW 114, SCEF 116, HSS 118, SCS 120, AS 122, and/or any RF elements discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various operations as described for various embodiments discussed herein in a network environment (e.g., for networks such as those illustrated in FIG. 1). In various embodiments, one or more of UE 102, MSC 106, MME 108, SGSN 110, SGW 112, GGSN/PGW 114, SCEF 116, HSS 118, SCS 120, AS 122, and/or any RF elements discussed herein can include software (or reciprocating software) that can coordinate in order to achieve operations associated with providing device triggering for non-IP data delivery in a network environment as discussed herein and may include any suitable algorithms, hardware, software, components, modules, logic, clients, interfaces, and/or objects that facilitate the operations thereof. This may be inclusive of appropriate algorithms, communication protocols, interfaces, and/or standards, proprietary and/or non-proprietary that allow for the effective exchange of data or information.

In various embodiments, UE 102, MSC 106, MME 108, SGSN 110, SGW 112, GGSN/PGW 114, SCEF 116, HSS 118, SCS 120, AS 122, and/or any RF elements discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of UE 102, MSC 106, MME 108, SGSN 110, SGW 112, GGSN/PGW 114, SCEF 116, HSS 118, SCS 120, AS 122, and/or any RF elements discussed herein could be provided in any database, register, control list, cache, storage, and/or storage structure: all of which can be referenced at any suitable timeframe. Any such storage options may also be included within the broad term 'memory element' as used herein. Any of potential processing elements, controllers, applications, managers, logic, and/or machines described herein can be construed as being encompassed within the broad term 'processor'. In various embodiments, each of UE 102, MSC 106, MME 108, SGSN 110, SGW 112, GGSN/PGW 114, SCEF 116, HSS 118, SCS 120, AS 122, and/or any RF elements discussed herein can also include suitable interfaces for receiving, transmitting, and/or otherwise communicating data or information in a network environment.

Note that in certain example implementations, operations as outlined herein to facilitate device triggering for non-IP data delivery in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, and/or software [potentially inclusive of object code and source code] to be executed by a processor, or other similar machine, etc.). In some of these instances, a memory element and/or storage [as shown in FIGS. 4-7] can store data, software, code, instructions (e.g., processor instructions), logic, parameters, combinations thereof, or the like used for operations described herein. This includes memory elements and/or storage being able to store data, software, code, instructions (e.g., processor instructions), logic, parameters, combinations thereof, and/or the like that are executed to carry out operations described herein. A processor (e.g., a hardware processor) can execute any type of instructions associated with data to achieve the operations detailed herein. In one example, a processor [as shown in FIGS. 4-7] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor), and/or one or more the elements identified herein could be some type of a programmable processor, programmable digital logic (e.g., a field programmable gate array (FPGA), a DSP processor, an EPROM, a controller, an electrically erasable PROM (EEPROM), and/or an ASIC that includes digital logic, software, code, electronic instructions, or any suitable combination thereof.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, machine, compute node combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, by a Service Capability Exposure Function (SCEF), a request to send data to a user equipment (UE), wherein the request comprises at least one of an external identifier associated with the UE and a Mobile Station International Subscriber Directory Number (MSISDN) associated with the UE;
   determining, from a context table maintained at the SCEF and using at least one of the external identifier and the MSISDN, whether a context for the UE is available at the SCEF when the request is received;
   upon determining the context for the UE is not available at the SCEF when the request is received, querying a subscriber database to determine whether the context for the UE is available at the subscriber database;
   setting, at the SCEF, a short message service (SMS) flag to instruct a Mobility Management Entity (MME) to perform device triggering to the UE via an SMS device triggering process;
   sending the data for the UE and the SMS flag to the MME by the SCEF using an interface directly interconnecting the MME and the SCEF based on a determination that the context for the UE is available at the subscriber database;
   determining at the MME that the data is to be sent to the UE using the SMS device triggering process based on the SMS flag;
   sending the data to a Mobile-services Switching Centre (MSC) from the MME; and
   sending the data to the UE from the MSC using an SMS message.

2. The method of claim 1, wherein the interface directly interconnecting the MME and the SCEF is a 3rd Generation Partnership Project (3GPP) T6a interface.

3. The method of claim 1, wherein sending the data for the UE further comprises sending a Diameter-based message to the MME using the interface.

4. The method of claim 1, further comprising:
   sending the data to the UE from the MME.

5. The method of claim 1, wherein sending the data for the UE further comprises sending a Diameter-based message to the MME using the interface, wherein the Diameter-based message includes, at least in part, a flag indicating that the data is to be sent to the UE using a SMS.

6. The method of claim 1, wherein the subscriber database is a Home Subscriber Server (HSS) and wherein the querying is performed using the external identifier or the Mobile Station International Subscriber Directory Number (MSISDN) associated with the UE.

7. The method of claim 1, further comprising:
   sending a notification to a Service Capability Server (SCS) that the UE is not found based on no context being available for the UE in the subscriber database.

8. One or more non-transitory tangible media encoding logic that includes instructions for execution by a processor, wherein the execution causes the processor to perform operations comprising:
   receiving, by a Service Capability Exposure Function (SCEF), a request to send data to a user equipment (UE), wherein the request comprises at least one of an external identifier associated with the UE and a Mobile Station International Subscriber Directory Number (MSISDN) associated with the UE;
   determining, from a context table maintained at the SCEF and using at least one of the external identifier and the MSISDN, whether a context for the UE is available at the SCEF when the request is received;
   upon determining the context for the UE is not available at the SCEF when the request is received, querying a subscriber database to determine whether the context for the UE is available at the subscriber database;
   setting, at the SCEF, a short message service (SMS) flag to instruct a Mobility Management Entity (MME) to perform device triggering to the UE via an SMS device triggering process;
   sending the data for the UE and the SMS flag to the MME by the SCEF using an interface directly interconnecting the MME and the SCEF based on a determination that the context for the UE is available at the subscriber database;
   determining at the MME that the data is to be sent to the UE using the SMS device triggering process based on the SMS flag;
   sending the data to a Mobile-services Switching Centre (MSC) from the MME; and
   sending the data to the UE from the MSC using an SMS message.

9. The media of claim 8, wherein sending the data for the UE further comprises sending a Diameter-based message to the MME using a 3rd Generation Partnership Project (3GPP) T6a the interface.

10. The media of claim 8, wherein the execution causes the processor to perform further operations comprising:
    sending the data to the UE from the MME.

11. The media of claim 8, wherein sending the data for the UE further comprises sending a Diameter-based message to the MME using a 3rd Generation Partnership Project (3GPP) T6a interface, wherein the Diameter-based message includes, at least in part, a flag indicating that the data is to be sent to the UE using a SMS.

12. The media of claim 8, wherein the execution causes the processor to perform further operations comprising:
    sending a notification to a Service Capability Server (SCS) that the UE is not found in based on no context being available for the UE in the subscriber database.

13. A system comprising:
    at least one memory element for storing data; and
    at least one processor for executing instructions associated with the data, wherein the executing causes the system to perform operations comprising:
    receiving, by a Service Capability Exposure Function (SCEF), a request to send data to a user equipment (UE), wherein the request comprises at least one of an external identifier associated with the UE and a Mobile Station International Subscriber Directory Number (MSISDN) associated with the UE;
    determining, from a context table maintained at the SCEF and using at least one of the external identifier and the MSISDN, whether a context for the UE is available at the SCEF when the request is received;
    upon determining the context for the UE is not available at the SCEF when the request is received, querying a subscriber database to determine whether the context for the UE is available at the subscriber database;
    setting at the SCEF a short message service (SMS) flag to instruct a Mobility Management Entity (MME) to perform device triggering to the UE via an SMS device triggering process;
    sending the data for the UE and the SMS flag to the MME by the SCEF using an interface directly interconnecting the MME and the SCEF based on a determination that the context for the UE is available at the subscriber database;

determining at the MME that the data is to be sent to the UE using the SMS device triggering process based on the SMS flag;

sending the data to a Mobile-services Switching Centre (MSC) from the MME; and sending the data to the UE from the MSC using an SMS message.

14. The system of claim 13, wherein the interface directly interconnecting the MME and the SCEF is a 3rd Generation Partnership Project (3GPP) T6a interface.

15. The system of claim 14, wherein sending the data for the UE further comprises sending a Diameter-based message to the MME using the T6a interface.

16. The system of claim 13, wherein sending the data for the UE further comprises sending a Diameter-based message to the MME using the interface, wherein the Diameter-based message includes, at least in part, a flag indicating that the data is to be sent to the UE using a SMS.

17. The system of claim 13, wherein the executing causes the system to perform operations comprising:

sending a notification to a Service Capability Server (SCS) that the UE is not found based on no context being available for the UE in the subscriber database.

* * * * *